April 14, 1959   W. H. CROSBY ET AL   2,881,756
INTESTINAL BIOPSY CAPSULE

Filed Feb. 3, 1958   2 Sheets-Sheet 1

INVENTORS
William H. Crosby
Heinz W. Kugler
BY
ATTORNEYS

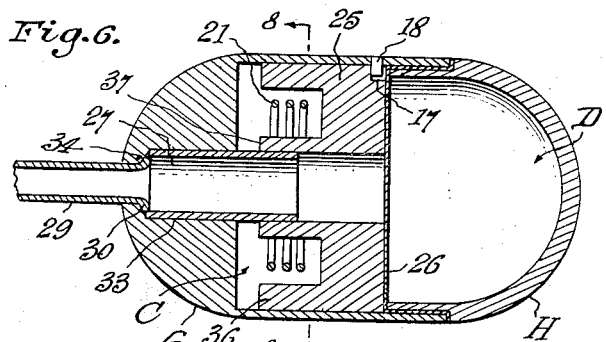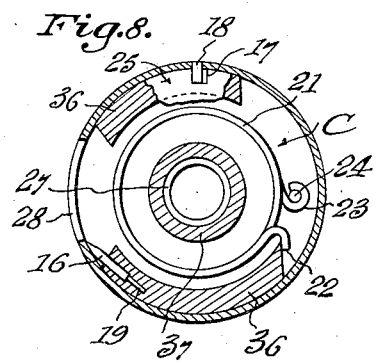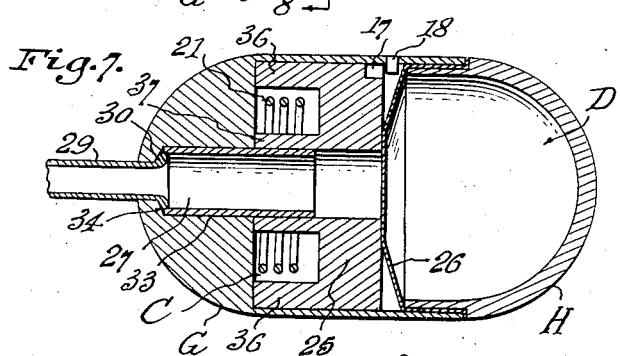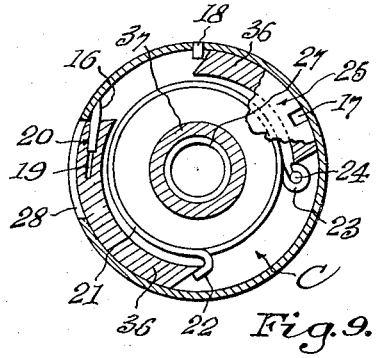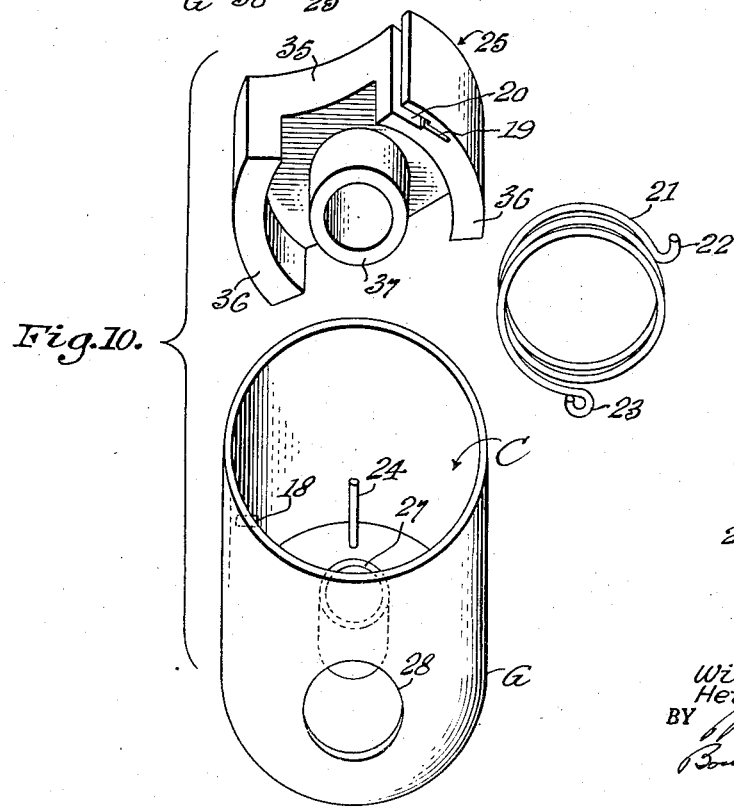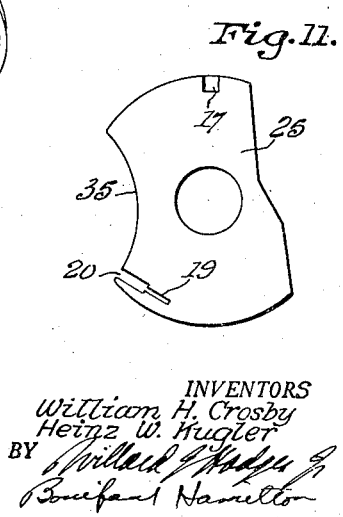
INVENTORS
William H. Crosby
Heinz W. Kugler
ATTORNEYS

2,881,756

INTESTINAL BIOPSY CAPSULE

William H. Crosby, United States Army, and Heinz W. Kugler, College Park, Md.

Application February 3, 1958, Serial No. 713,071

4 Claims. (Cl. 128—2)

(Granted under Title 35, U. S. Code (1952), sec. 266)

The invention described herein may be manufactured and used by or for the Government for governmental purposes without the payment of any royalty thereon.

This invention relates to an instrument for obtaining tissue samples internally of certain parts of the human body, inaccessible except by surgery, by introduction of the device into body cavities and more particularly to an instrument for obtaining intralumenal biopsies of the intestinal mucosa.

Although the instrument was designed for jejunal biopsy, it can be used to obtain specimens from any site between the oropharynx and the ileocecal valve.

It is the general object of this invention to obtain specimens of the intestinal mucosa from a subject safely and reliably with minimum of hardship on the subject with the use of an instrument that is technically uncomplicated.

Objects and advantages of the invention will become apparent as the description proceeds, and the features of novelty will be pointed out in particularity in the appended claims.

Briefly stated, the subject invention embodies a cutting element comprising a rotating knife inside a separable capsule which latter is held captive on a polyethylene tube which serves to transmit suction as well as a means of retrieving the capsule. The knife is spring-activated and triggered by suction applied to a release mechanism through the tube. The application of suction first draws a bit of mucosa into an opening in the capsule before activating the mechanism for releasing the knife severing the sample drawn into the opening.

The construction of the subject invention will be understood more clearly from reference to the accompanying drawings in which—

Fig. 6 is a central section of a modification;

Fig. 7 is a central section as in Fig. 6 showing the block in released position but not rotated;

Fig. 8 is a transverse section taken on the line 8—8 of Fig. 6 before release of the knife-carrying block;

Fig. 9 is a transverse section like Fig. 8 showing the position of the knife-carrying block when a cut is completed;

Fig. 10 is a disassembled perspective view of the embodiment of Fig. 6; and

Fig. 11 is a plan view of the knife-carrying block included in Fig. 10.

Referring more particularly to the drawings, the perspective views show details of embodiments of a suitable instrument for obtaining intestinal specimens for biopsies and for other studies, from which views it will be seen that the instrument comprises essentially two parts, namely, a cylindrical capsule with rounded ends, divided transversely by a rubber diaphragm to form two chambers and a cylindrical block that pivots on a central axis carrying a knife blade which sweeps the wall of the capsule through an arc of about 90 degrees. Structural details of each embodiment will be described hereinafter.

Figure 1:
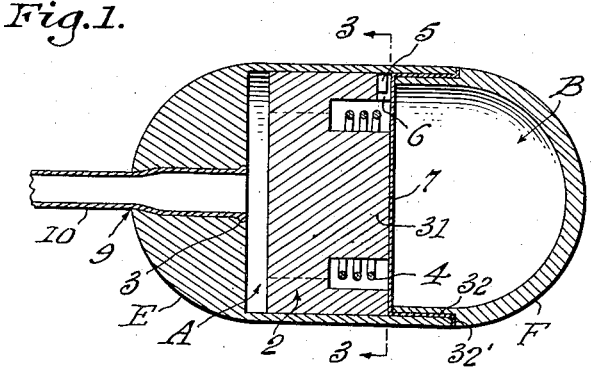
Fig. 1 is a central section of the capsule of a preferred form of the invention.
Figure 3:
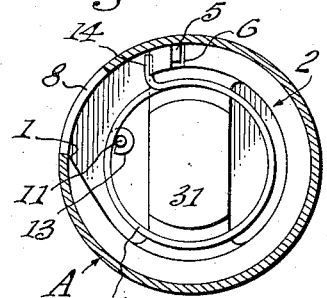
Fig. 3 is a transverse section taken on line 3—3 of Fig. 1 showing the knife-carrying block in cocked position prior to rotation of the block.
Figure 2:
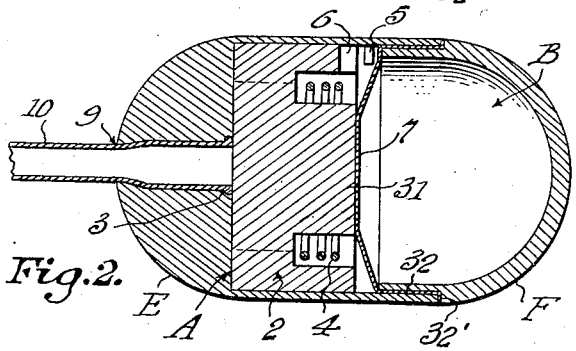
Fig. 2 is a central section of the capsule of Fig. 1 showing the knife-carrying block in released position but not yet rotated.
Figure 4:
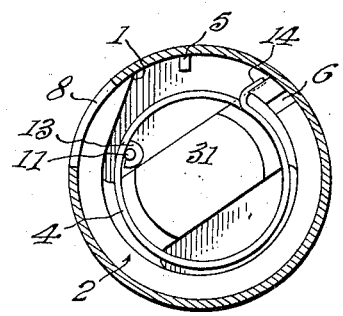
Fig. 4 is a transverse section like Fig. 3, showing the position of the knife-carrying block when a cut is completed.
Figure 5:
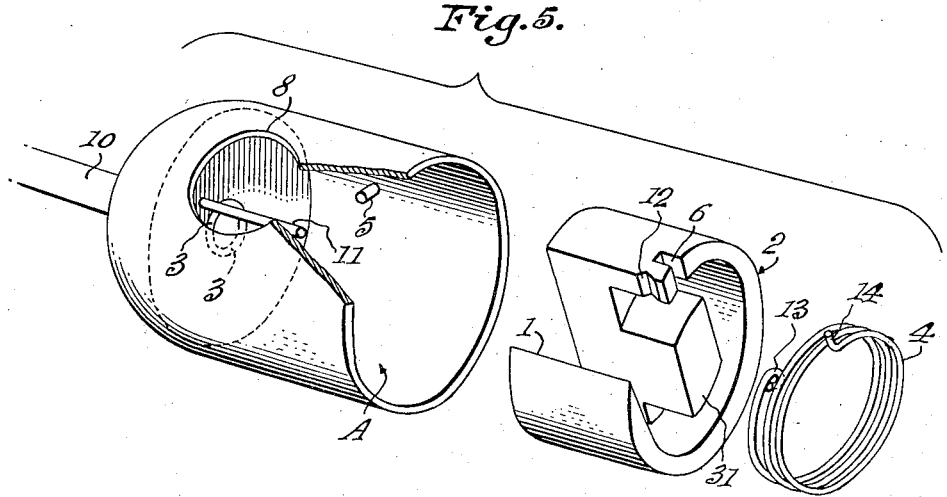
Fig. 5 is a disassembled perspective view of the embodiment of Fig. 1.

The two chambers A and B, as shown in Figs. 1 through 5, form the cylindrical capsule in the preferred embodiment. In chamber A is the cylindrical block 2, having a knife edge 1 formed thereon. The block 2 fits snugly within chamber A and is capable of rotary movement as well as linear movement. The rotary movement of the block 2 is accomplished by a spring 4 coiled about the upstanding portion 31 of block 2. The spring 4 is held at one end by pin 11, loop 13 of spring 4 fitting over the said pin. Spring 4 ends in an upcurved portion 14 which fits into niche 12. The block 2 is held in the cocked position (Figs. 1 and 3), by a key 5 on the wall of chamber A which fits into a slot 6 on the periphery of the block 2. The knife edge 1 is "sprung" by moving the block 2 in the linear direction, toward the left in Fig. 1, until the key 5 escapes from the slot 6 and the block 2 is then free to pivot.

The two-part capsule of Figs. 1–5 includes a receptacle portion E and a cap closure member F which are interfitted to provide a smooth exterior surface. The cap closure member F has a reduced wall portion as at 32 which slip fits within the upstanding wall portion of the receptacle portion E to an extent limited by the shoulder 32' on the reduced wall portion 32. The joint between the interfitting receptacle E and cap F is sealed so as to be airtight by clamping therebetween a portion of the rubber diaphragm 7 sufficient to form a seal extending the length of the joint.

The receptacle portion E is provided with a passage 9 through which a flexible tube 10 is inserted to communicate with the chamber A for a purpose to be hereinafter described. The end of the tube 10 communicating with the chamber A is enlarged to form a flange as at 3. A port 8 in the wall of receptacle A is located to permit the knife edge 1 to sweep across this opening when the block 2 is rotated within the receptacle A in a manner to be hereinafter described.

The separation of chambers A and B by diaphragm 7 and the sealing of the joint between the receptacle A and cap B provides an airtight space in chamber B which permits the chamber B to act in the same manner as the partially evacuated can of an aneroid type pressure indicating instrument, as will be more fully described hereinafter.

The assembly of the entire unit is accomplished as follows: Flexible tubing 10 is inserted into passage 9 of chamber A until several centimeters protrude from the capsule. The end is held close to the side of a flame until the edge of the plastic softens and swells to form a flange 3. The tube 10 is now withdrawn until the flange 3 seats itself against the shoulder of the passage in the capsule. The block 2 is then inserted into chamber A and cocked with spring 4 and key 5 as previously indicated. In the cocked position the knife edge 1 will be poised against the side of chamber A just before port 8. This position leaves room between the opening 9 and block 2 in chamber A for eventual linear movement of block 2 toward opening 9. The chambers A and B are then pressed together with the rubber diaphragm 7 between them.

Another embodiment, quite similar to the preferred embodiment, is shown in Figs. 6 through 11.

The chief differences are the presence of a central axle 27, a removable knife blade 16, and a change in the relative position of the spring and block.

Looking at Figs. 6 through 11, it is seen that chambers C and D have much the same design and utility as did A and B, respectively. The receptacle portion G and the cap portion H are interfitted in the same manner as previously described for Figs. 1–5. Chamber C has a passage 33 having a centrally located tubular member 27 to which is connected flexible tubing 29 which extends externally of the receptacle portion E. A flange 30 is made in the same way as flange 3 was made and the tubing 29 is withdrawn until the flange 30 seats itself against the shoulder 34 of the passage 33.

Block 25, including a planar portion 35 and arcuate upstanding portions 36 surrounding a central upstanding cylindrical portion 37, has a removable knife edge 16 inserted into slot 20, which is cut into the block and is slightly smaller than the thickness of the blade 16 and narrows into a slot 19 deeper than the knife 16 to give the block 25 spring tension in holding the knife 16. To insert the knife 16, which can be a fragment of a surgical scalpel, simply press it into slot 20. Spring 21 is seated in the recess formed between the arcuate portions 36 and the cylindrical portion 37 and is held in cocked condition as hereafter described. Chamber C has a port 28, a key 18 and a pin 24 which operate in the same manner as do port 8, key 5 and pin 11, respectively, in chamber A of the preferred embodiment.

The spring 21 is placed in position on block 25 and the block 25 is placed in the bottom of chamber C with tweezers making certain that loop 23 of spring 21 fits over pin 24. The block 25 is then rotated counter-clockwise until key 18 and slot 17 line up. The block 25 is then pulled forward 1 mm. and the key 18 seating in slot 17 keeps the mechanism cocked. Chambers C and D fit together in a manner similar to Figs. 1–5 with rubber diaphragm 26 therebetween, chamber D being empty and airtight to serve as an aneroid. The block 25 rotates about the central tubular member 27 so that the knife blade 16 sweeps across the port 28 in the wall of chamber C through an arc of approximately 90 degrees.

The knife is "sprung" in the same manner as described in the preferred embodiments. Block 25 is moved in a linear direction until the key 18 escapes from slot 17, whereby the spring 21 rotates the block 25 sweeping the knife past the port 28. Pin 24 serves as a stop for the block 25.

The operation of the invention is similar in both embodiments. The preferred embodiment will be used in the following description; however, the description will be applicable to both embodiments.

The capsule is swallowed and after it has passed into the stomach, the subject lies on his right side until it passes through the pylorus. When three or four feet of tubing have been drawn past the lips the capsule is in the jejunum. Its position can be confirmed by fluoroscopy. A syringe equipped with a 17-gauge needle (not shown) is attached to the end of tubing 10. To activate the knife 1, suction is applied to chamber A through the flexible tube 10 by pulling out the piston of the syringe at a rate of about one ml. per second. Intestinal mucosa adjacent to the port 8 is sucked into chamber A thereby occluding the port. Suction continues and the pressure in chamber A becomes less than in chamber B. The rubber diaphragm 7 bulges into chamber A, pushing block 2 in a linear direction off the key 5 and thereby releasing the spring-activated mechanism. The knife edge 1 snaps shut. The sound can be heard through a stethoscope held against the subject's abdomen. This amputates the mucosa which has herniated into chamber A and closes the port 8. Pin 11 acts as a stop for the block 2 after it is released and key 5 retains the block 2 so that it cannot drop out accidentally.

The capsule is now withdrawn by steady, gentle traction on the tubing 10. The subject should be encouraged to keep his chin elevated and to give a series of sharp coughs to help move the capsule along. The capsule pauses at the pylorus and again at the cardia. If one wishes to biopsy the mucosa of the duodenum or the cardia, these pauses during the ascent may be used as landmarks to place a "cocked" capsule in an appropriate position.

If it is desired to use the capsule during the absorptive state, the capsule can be closed to food particles by allowing a film of collodion to dry across the port. When the capsule is in the desired position the film is broken by an injection of air down the tubing before the aspiration is done.

When the capsule is retrieved the specimen is removed from the disassembled instrument using thumb forceps. The specimen should be oriented on a piece of moist filter paper before dropping it into the fixative.

One embodiment of the capsule was made of stainless steel, approximately 7 mm. in diameter and 19 mm. in length. The halves A and B, which formed the two chambers, were fitted together by a slip joint allowing .006 gap for the rubber diaphragm 7. The port 8 for entry of the biopsy sample was 5 mm. in diameter. This accommodates an adequate piece of mucosa without danger of dimpling and nipping the muscularis. The aperture 9 for the plastic tubing 10 was 2 mm. in diameter which snugly accommodates size 200 polyethylene tubing. The spring 4 was a spiral of .016 steel wire having two and one-half turns with the loop 13 at one end to fit over pin 11 and a 90° bend 14 on the other to catch against the block 2. The diaphragm 7 was of .008 latex rubber, the sort used for dental dams.

The embodiments of the invention illustrated in the accompanying drawings and described specifically in the foregoing description are illustrative of representative examples of the present invention, but it will be apparent that specific structural details may be varied without departing from the inventive concept. Accordingly, it will be understood that it is intended and desired to embrace within the scope of the invention such modifications and changes as may be necessary or desired to adapt it to varying conditions and uses as defined by the appended claims.

We claim:

1. A surgical cutting device for obtaining specimens of intestinal mucosa which comprises in combination, a capsule capable of being swallowed and having an opening therein communicating with a chamber in said capsule, suction means communicating with the interior of said capsule for herniating adjacent mucosa through said opening into said chamber, and releasable cutting means within said capsule for amputating the herniated mucosa, said cutting means being actuated responsive to operation of said suction means.

2. A surgical cutting device for obtaining specimens of intestinal mucosa comprising a capsule capable of being swallowed, said capsule including interfitting portions forming aligned chambers, a diaphragm separating said chambers and providing a seal between said interfitting portions and rendering a first one of said chambers airtight, a second one of said chambers having a port and cutting means on a releasable spring-actuated rotatable block fitted in said second chamber, said cutting means positioned on said block to sweep the said port upon rotation of said block, and means communicating with the interior of said second chamber for applying suction to said diaphragm and releasing said spring-actuated block whereby said cutting means sweeps across said port.

3. A surgical cutting instrument for obtaining specimens of intestinal mucosa comprising a capsule capable of being swallowed, tube means connected to an opening in said capsule and communicating with the interior thereof for applying suction interiorly of said capsule and for retrieving it, said capsule including separable portions interfitted by a slip joint and having a diaphragm therebetween forming first and second chambers, said first chamber being airtight and said second chamber having a releasable spring-actuated rotatable block fitted therein, said block carrying cutting means projecting beyond an edge thereof adjacent to the wall of said second chamber, a port in said second chamber so positioned as to be swept by said knife means upon rotation of the block, said block being held in cocked position by key means within said second chamber, whereby suction applied to the tube means herniates mucosa adjacent the outer surface of said capsule into the chamber through the said port and forces the diaphragm to move said block in a linear direction out of engagement with said key means, rotating said block and amputating the herniated mucosa with said knife means.

4. A surgical cutting device as claimed in claim 3 wherein the block comprises two semi-circular flanges adapted to fit snugly against the walls of said second chamber and a hub adapted to rotate on a longitudinal axis, cutting means carried by one of said flanges for wiping contact with the walls of said second chamber, said flanges surrounding said hub and forming a recess to receive a spring actuator for said block.

References Cited in the file of this patent

UNITED STATES PATENTS

| | | |
|---|---|---|
| 11,942 | Myers | Nov. 14, 1854 |
| 2,708,437 | Hutchins | May 17, 1955 |
| 2,721,555 | Jenney | Oct. 25, 1955 |